(12) United States Patent
Min-Cheol

(10) Patent No.: US 6,722,702 B1
(45) Date of Patent: Apr. 20, 2004

(54) COUPLER HAVING GUARD CAP

(75) Inventor: Choe Min-Cheol, Incheon (KR)

(73) Assignee: DMT Co., Ltd. (KR)

( * ) Notice: Subject to any disclaimer, the term of this patent is extended or adjusted under 35 U.S.C. 154(b) by 0 days.

(21) Appl. No.: 10/355,120

(22) Filed: Jan. 31, 2003

(30) Foreign Application Priority Data

Dec. 30, 2002 (KR) .................................. 2002-0086719

(51) Int. Cl.⁷ .............................................. F16L 37/092
(52) U.S. Cl. ............................. 285/45; 285/93; 285/81; 285/322
(58) Field of Search ............................. 285/39, 45, 81, 285/322, 323, 93

(56) References Cited

U.S. PATENT DOCUMENTS

| | | | | |
|---|---|---|---|---|
| 3,653,689 A | * | 4/1972 | Sapy et al. .................. 285/113 |
| 3,909,046 A | * | 9/1975 | Legris ........................... 285/39 |
| 4,573,716 A | * | 3/1986 | Guest ........................... 385/323 |
| 4,722,560 A | * | 2/1988 | Guest ........................... 285/323 |
| 4,923,220 A | * | 5/1990 | Guest et al. .................... 285/39 |
| 5,042,848 A | * | 8/1991 | Shiozaki ...................... 285/277 |
| 5,174,611 A | * | 12/1992 | Byrd et al. .................... 285/45 |
| 5,443,289 A | * | 8/1995 | Guest ........................... 285/39 |
| 5,468,027 A | * | 11/1995 | Guest ........................... 285/319 |
| 5,607,193 A | * | 3/1997 | Guest ........................... 285/308 |
| 5,992,895 A | * | 11/1999 | Steinkamp .................... 285/45 |

\* cited by examiner

Primary Examiner—Eric K. Nicholson
(74) Attorney, Agent, or Firm—Rothwell, Figg, Ernst & Manbeck, p.c.

(57) ABSTRACT

The present invention relates to a coupler, in which a guard cap coupled to a high-frequency heat-sealed cap member is additionally provided at both ends of the body member to prevent the collator and the tube from separating from the body member and cut off foreign matter from flowing into the body member, and the color of the guard cap is made different to make it easy to identify from outside the contents flowing in the tube. The coupler comprises a coupling member 200 and 200a having a plurality of guide protrusions 210 and 210a that are formed at predetermined lengths and regularly spaced intervals and extended along the outer rim of a cap member 12 and stop protuberance 220 that is bent-formed at one end portion of the guide protrusions 210 and 210a; and a guard cap 100 that is coupled to said coupling member 200 and 200a so as to prevent the collator 30 and the tube 20 from being separated from the body member 11 by external force and foreign matter from infiltrating into said tube 20 from outside.

3 Claims, 5 Drawing Sheets

COUPLER HAVING GUARD CAP

BACKGROUND OF THE INVENTION

1. Field of the Invention

The present invention relates to a coupler having a guard cap, and more specifically to a coupler, in which a guard cap coupled to a high-frequency heat-sealed cap member is additionally provided at both ends of the body member to prevent the collator and the tube from separating from the body member and cut off foreign matter from flowing into the body member, and the color of the guard cap is made different to make it easy to identify from outside the contents flowing in the tube.

2. Description of the Related Art

Generally, in the piping system used as water purifier piping, chemical feed pipes, or stock solution feed pipes, a coupler used to couple the tubes are required to make tube connection convenient, maintain watertightness and airtightness, and be securely fixed.

To take a brief look at the composition of the conventional coupler, it is largely divided into a body member to which tubes are connected on the left and right respectively, a cap member that is high-frequency heat-sealed monolithically to both ends of the body member, and a collator that is inserted and fixed in the cap member and tightens the surface of the tube so as to prevent the tube from being broken away.

The conventional coupler of such a composition has an advantage that the tube can perform the original function without being broken away, but because a separate device is not equipped to protect the collator coupled to the body member, there is a fear that the collator might separate from the body member if external force is applied to the collator. And when the contents (i.e. fluid) flowing in the tube are flowing at a constant pressure and the pressure is lowered temporarily, the collator tightening the tube is loosened temporarily. At this time, there is a problem that if external force is applied to the tube or collator, the tube or collator is forced to separate from the body member.

Furthermore, because the collator and cap member are always exposed on the body member, foreign matter floating in the air infiltrates into the body member through the gap between the joint of the collator and cap member, so it is not sanitary. And because there is no means of identifying from outside the contents flowing in the tube, there is a difficulty in identifying the contents and it is disadvantageous in terms of maintenance.

SUMMARY OF THE INVENTION

It is an object of the present invention to provide a coupler having a guard cap that can prevent the collator and tube from separating from the body member by providing an additional body cap coupled to the high-frequency heat-sealed cap member at both ends of the body member.

It is another object of the present invention to provide a coupler having a guard cap in which the guard cap tightly embraces the cap member and the collator so as to cut off foreign matter from infiltrating into the body member.

It is yet another object of the present invention to provide a coupler having a guard cap whereby it is easy to identify from outside the contents flowing in the tube by making different the color of the guard cap used in the coupler.

In accordance with another aspect of the present invention, there is provided a coupler provided with a body member to which tubes are coupled on the left and right respectively, a cap member that is high-frequency heat-sealed monolithically to both ends of the body member, and a collator that is inserted in the cap member and tightens the surface of the tube so as to prevent the tube from being broken away, the coupler comprising: a coupling member having a plurality of guide protrusions that are formed at predetermined lengths and regularly spaced intervals and extended along the outer rim of said cap member and stop protuberance that is bent-formed at one end portion of the guide protrusions; and a guard cap that is coupled to said coupling member so as to prevent the collator and the tube from being separated from the body member by external force and foreign matter from infiltrating into said tube from outside.

BRIEF DESCRIPTION OF DRAWINGS

Other objects and aspects of the present invention will become apparent from the following description of embodiments with reference to the accompanying drawings in which.

DESCRIPTION OF THE PREFERRED EMBODIMENT

A preferred embodiment of the present invention will now be described in more detail with reference to the accompanying drawings.

Figure 1:
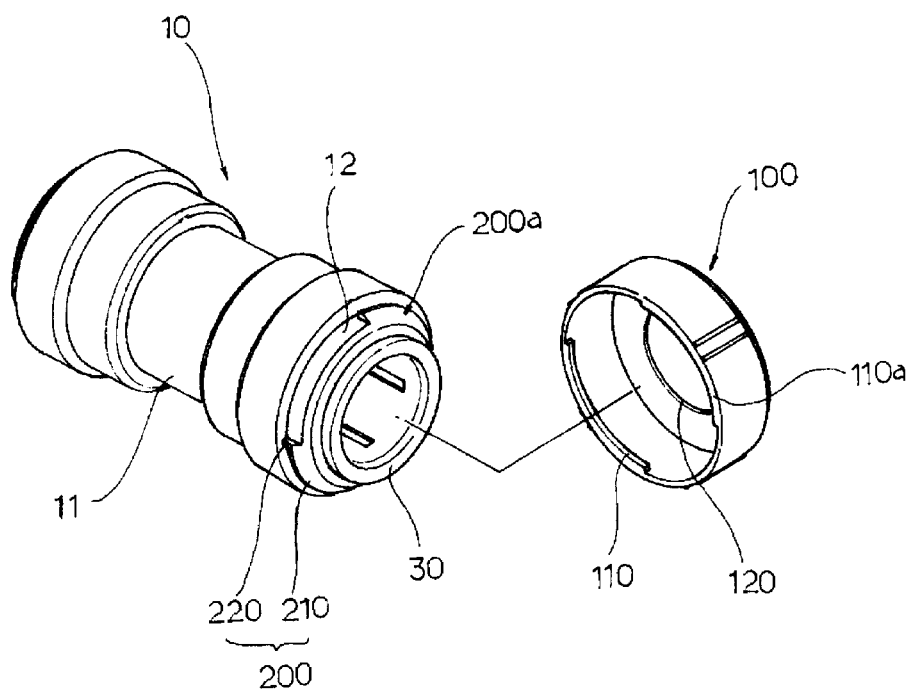
FIG. 1 is an exploded perspective view showing a guard cap separated from a coupler according to the present invention.
Figure 2:
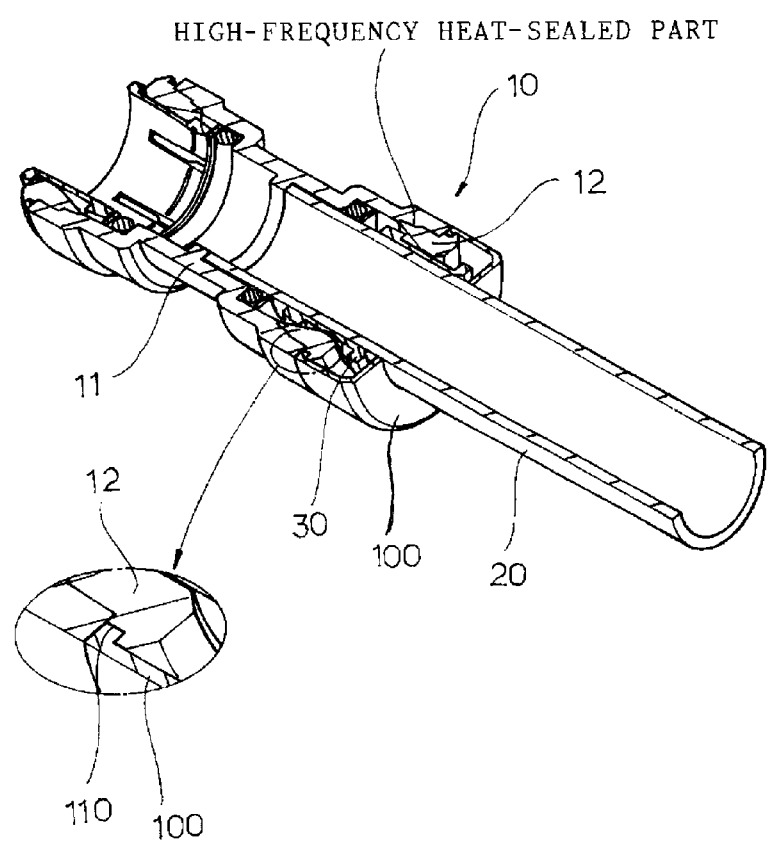
FIG. 2 is a partially cutaway view of the guard cap according to the present invention coupled to the coupler.

FIG. 1 is an exploded perspective view showing a guard cap separated from a coupler according to the present invention, and FIG. 2 is a partially cutaway view of the guard cap according to the present invention coupled to the coupler.

Figure 3:
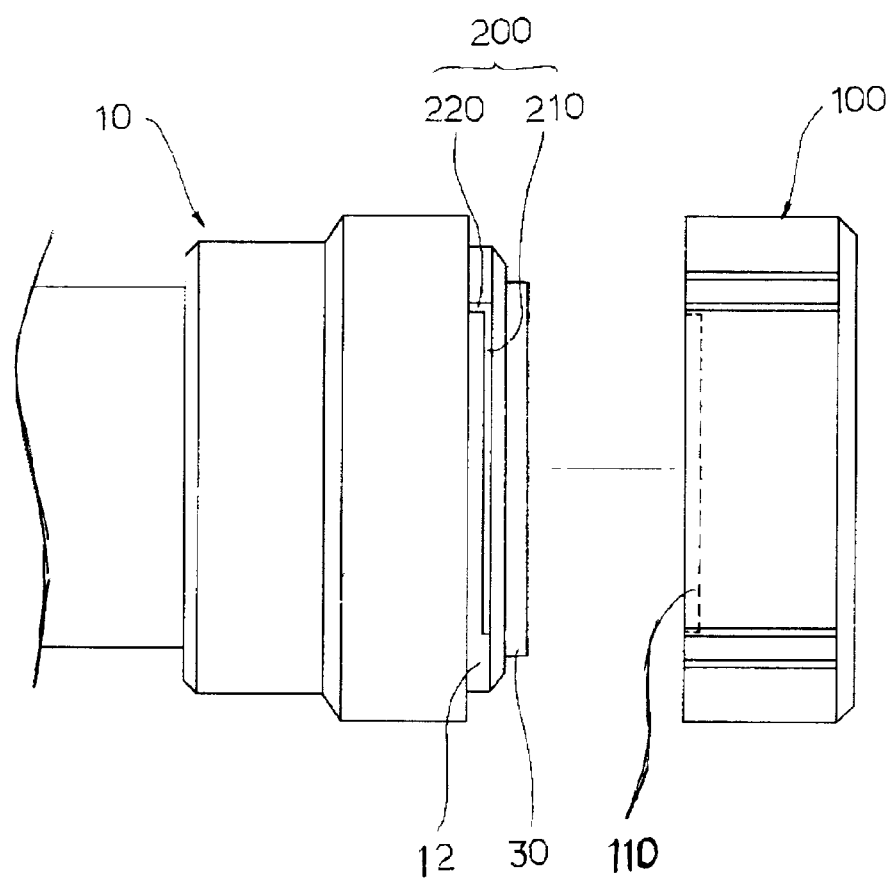
FIG. 3 is a side elevation view of the coupling member and guard cap according to the present invention.
Figure 4:
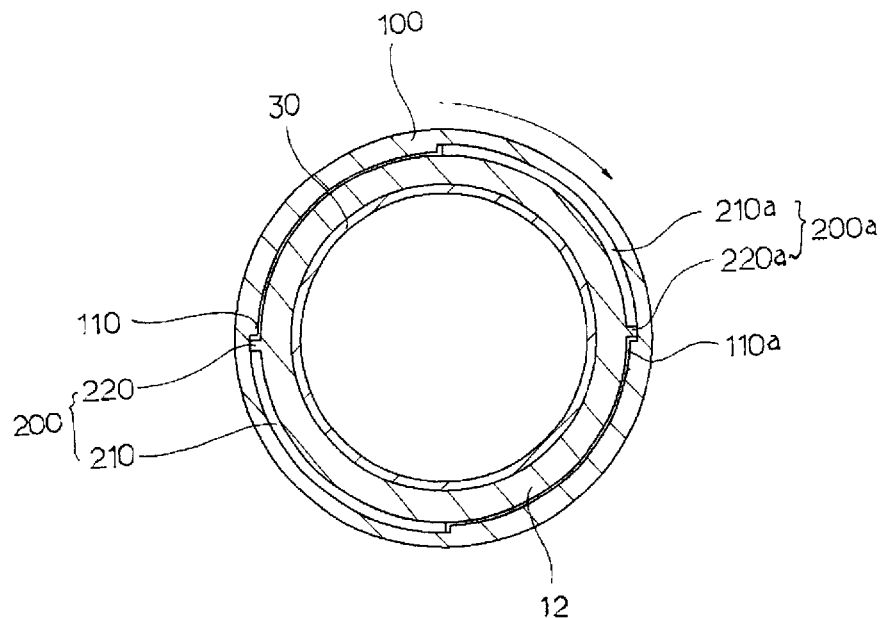
FIG. 4 is a plan view showing the state before the coupling member and fixed protrusion according to the present invention are coupled together.
Figure 5:
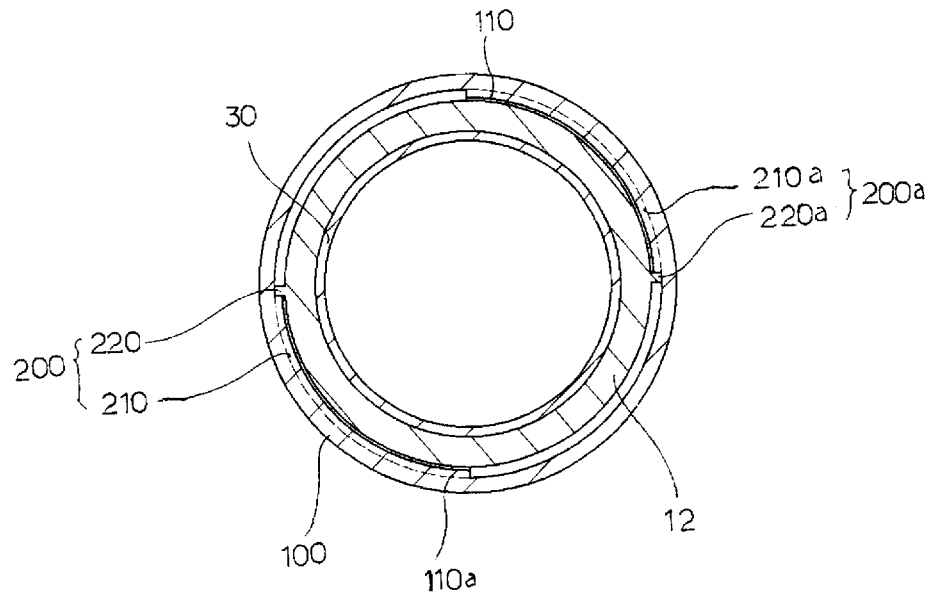
FIG. 5 is a plan view showing the state in which the coupling member and fixed protrusion according to the present invention are coupled together.

FIG. 3 is a side elevation view of the coupling member and guard cap according to the present invention, FIG. 4 is a plan view showing the state before the coupling member and fixed protrusion according to the present invention are coupled together, and FIG. 5 is a plan view showing the state in which the coupling member and fixed protrusion according to the present invention are coupled together.

Normally, a coupler 10 comprises a body member 11 to which tubes 20 are connected on the left and right respectively, a cap member 12 that is high-frequency heat-sealed monolithically to both ends of the body member 11, and a collator 30 that is inserted into one end of the cap member and tightens the tube 20 to fix and prevent it from being broken away. These parts are organically combined each other to play a role of fixing the tubes 20.

In a coupler of such a composition, as a way of preventing the tube 20 from being separated from the collator 30 as well as cutting off foreign matter from infiltrating into the coupler, the coupler 10 according to the preferred embodiment of the present invention exemplifies a composition in which a separate guard cap 100 is additionally provided. And for the purpose of fixing of the guard cap 100, the cap member 12 is provided additionally with coupling members 200 and 200a formed monolithically with it, as illustrated in FIGS. 1 to 5.

The coupling members 200 and 200a are provided with guide protrusions 210 and 210a that have predetermined lengths and regularly spaced intervals and extend along the outer rim of the cap member 12. In one end portion of these guide protrusions 210 and 210a are formed respectively stop protuberances 220 and 220a bent inwardly (i.e. toward the body member 11).

The guard cap 100, by being coupled with coupling members 200 and 200a, prevents the collator 30 and the tube 20 from being separated from the body member 11 by external intervention or force and at the same time prevents foreign matter from infiltrating into the tube 200. For these purposes, in the center of one end of the guard cap 100 is formed an insert slot 120 for the tube 20 to be inserted, and on the inner surface of the other end are monolithically injection-formed the fixed protrusions 110 and 110a that are guided along the guide protrusions 210 and 210a of the coupling member 200 and inserted and bound by stop protuberances 220 and 220a.

Here, it is illustrated that two coupling members 200 and 200a are provided in the cap member 12 and two fixed protrusions 110 are formed on the guard cap 100, but the number of pieces of these are not limited to this. Namely, as long as the guard cap 100 and the cap member 12 can maintain a sufficient coupling state, three, four or a plurality of coupling members 200 and 200a and fixed protrusions 110 can be provided according to the uses and the conditions such as fluid pressure.

Meanwhile, by making the guard cap 100 coupled to the body member 11 in different colors, it was made possible to identify the contents passing through the tube 20 from, outside. For example, the guard cap of the tube in which hot water flows is formed in red, and the guard cap of the tube in which cold water flows is formed in blue. Or by making different the colors of the tube in which stock solution flows and the tube in which mixed liquid flows, it can be made easy for the manager or user to identify the contents from outside.

During manufacture, at one end of the cap member 12 are formed the guide protrusions 210 and 210a having predetermined lengths and regularly spaced intervals, and in one end portion of the guide protrusions 210 and 210a are formed the stop protuberances 220 and 220a.

And, in the center of one end of the guard cap 100 is formed the insert slot 120 for the tube to be inserted, and on the inner surface of the other end are monolithically formed the fixed protrusions 110 and 110a having lengths and intervals corresponding to those of the guide protrusions 210 and 210a so as to be bound to the stop protuberances 220 and 220a while being guided along the guide protrusions 210 and 210a.

When the guard cap 100 and the coupling members 200 and 200a having such a composition are prepared, the cap member 12 is high-frequency heat-sealed to both ends of the body member 11, and then the collator 30 is inserted into the cap member 12 to complete the assembly.

Next, as illustrated in FIG. 4, if the guard cap 100 is rotated toward the stop protuberances 220 and 220a (in the arrow direction) while the fixed protrusions 110 and 110a of the guard caps 100 and 100a are positioned toward the cap member 12 without the guide protrusions 210 and 210a being interfered each other, the fixed protrusions 110 and 110a are guided along the guide protrusions 210 and 210a, and are stop-matched and bound to the stop protuberances 220 and 220a as illustrated in FIG. 5. Due to this, the guard cap 100 bound by the stop protuberances 220 and 220a comes to embrace the collator 30 and the cap member 12 from outside so as to protect these parts.

Because the guard cap 100 always embraces the collator 30 and the cap member 12 from outside, it is possible to prevent foreign matter from infiltrating into the body member 11 from outside. And because the guard cap 100 embraces and protects the collator 30 even if external force is applied to the collator 30 or the pressure of the fluid passing through the tube 20 is temporarily changed, it prevents the collator 30 and the tube 20 from being separated from the body member 12.

Meanwhile, as described above, because the guard caps 100 coupled to both ends of the body member 11 are made in different colors according to the contents passing in the tube 20, it is possible to easily identify the contents from outside.

Figure 6A:
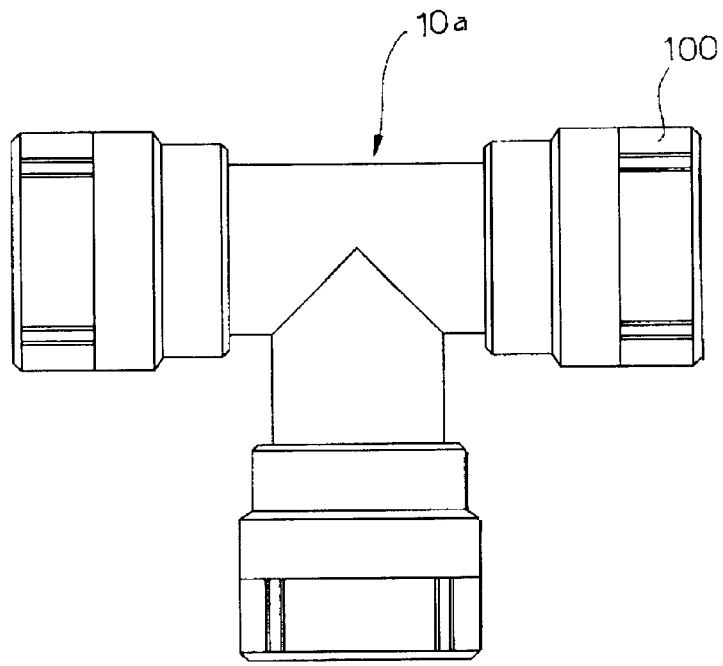
FIGS. 6a and 6b are front views showing the state in which the guard caps according to the present invention are coupled to the couplers of different shapes.
Figure 6B:
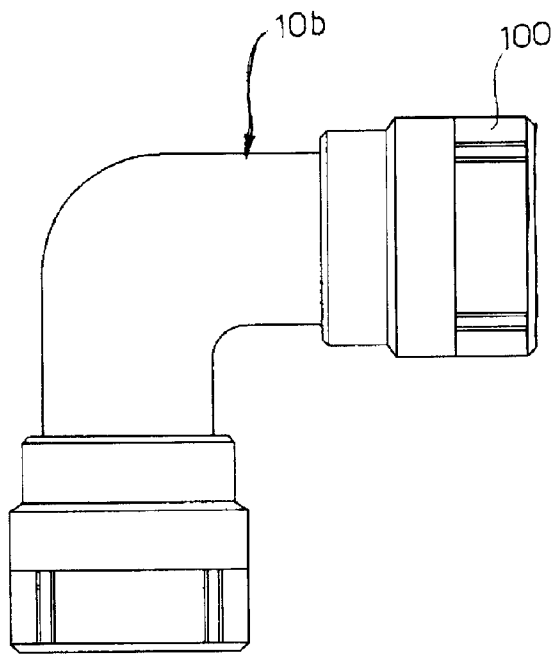

Meanwhile, the guard caps 100 of the present invention are applied not only to the linear collator as illustrated in FIGS. 1 to 5, but it can be installed and used also in a "T" shaped coupler 10a or an "L" shaped coupler 10b, as illustrated in FIGS. 6a and 6b. Furthermore, though not illustrated in a drawing, it can be installed and used in couplers of other various forms.

As seen in the above, according to the present invention, additional guard caps are coupled to a high-frequency heat-sealed cap member in both ends of the body member, so the collator and the tube are prevented from separating from the body member even if external force is applied from outside or the pressure of the fluid passing in the tube is changed.

And, because the guard caps always embrace tightly the cap member and the collator, foreign matter from outside is cut off from flowing into the body member, so it is possible to use the coupler in a sanitary condition at all times.

Furthermore, since the guard caps used in the coupler have different colors, there is an effect that the fluid passing in the tube can be easily identified from outside.

What is claimed is:

1. A coupler provided with a body member to which tubes are coupled on the left and right respectively, a cap member that is high-frequency heat-sealed monolithically to both ends of the body member, and a collator that is inserted in the cap member and tightens the surface of the tube so as to prevent the tube from being broken away, the coupler comprising:

a coupling member having a plurality of guide protrusions that are formed at predetermined lengths and regularly spaced intervals and extended along the outer rim of said cap member and stop protuberance that is bent-formed at one end portion of the guide protrusions; and a guard cap that is coupled to said coupling member so as to prevent the collator and the tube from being separated from the body member by external force and foreign matter from infiltrating into said tube from outside.

2. The coupler of claim 1, wherein an insert slot is formed in the center of one end of said guard cap for a tube to be inserted, and fixed protrusions having predetermined lengths and regularly spaced intervals corresponding to the guide protrusions of the coupling member so as to be guided along the guide protrusions and bound by the stop protuberances are monolithically injection-formed on the inner surface of the other end.

3. The coupler of claim 1, wherein the guard cap coupled to said body member has different color.

* * * * *